United States Patent Office 3,485,689
Patented Dec. 23, 1969

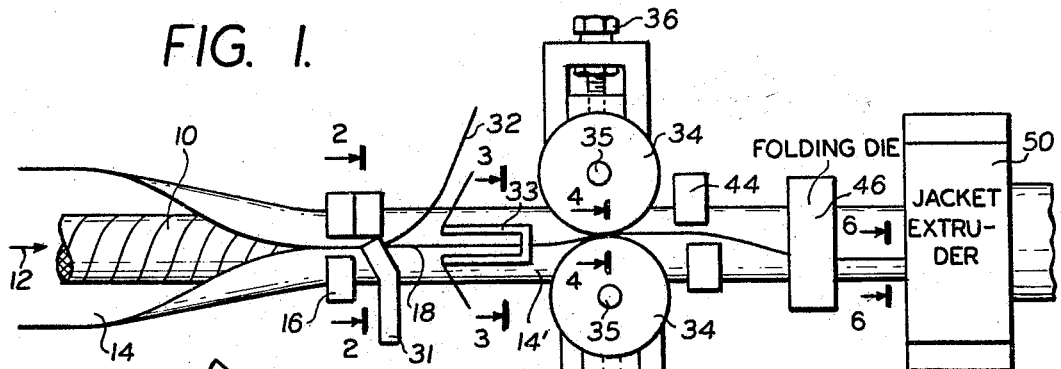
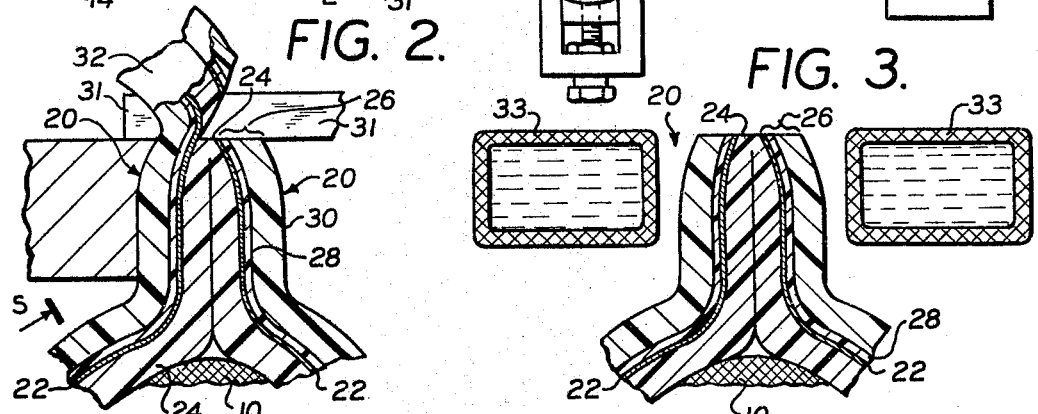
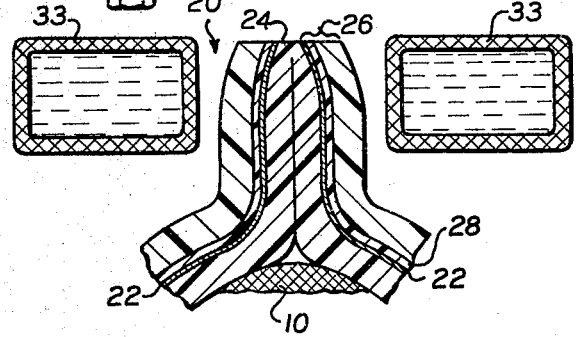
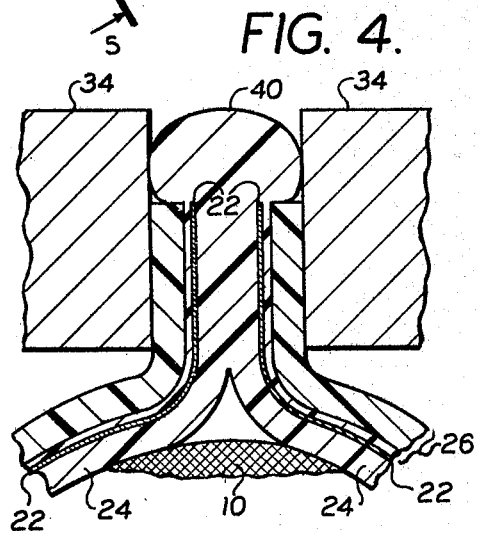
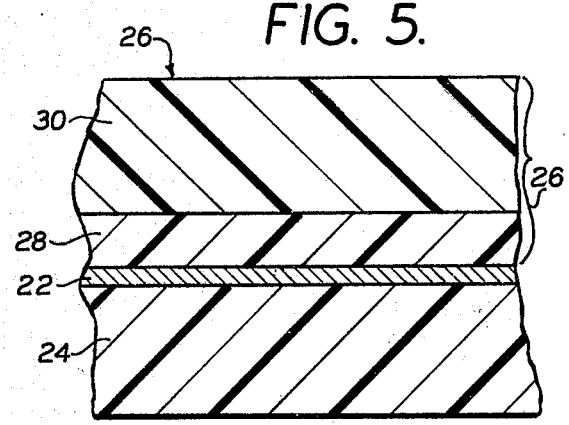
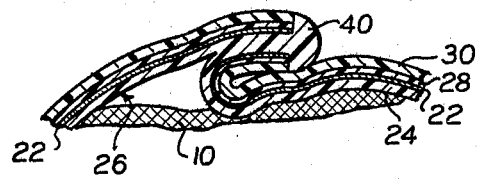
INVENTOR
FRED F. POLIZZANO
ATTORNEYS.

3,485,689
METHOD AND APPARATUS FOR
MAKING CABLE
Fred F. Polizzano, Allendale, N.J., assignor to General
Cable Corporation, New York, N.Y., a corporation of
New Jersey
Filed Dec. 6, 1966, Ser. No. 599,640
Int. Cl. H01b 13/06
U.S. Cl. 156—54          7 Claims This invention relates to the sealing of jackets or sheaths of electric cables.

It is an object of the invention to provide an improved seal for the longitudinal seam of a laminated electric cable jacket or sheath that has tabs bent up and bonded together across their confronting faces to prevent entry of water or vapor into the cable. A jacket of this type is the inner jacket of the L. Jachimowicz Patent 3,206,-541, Sept. 14, 1965. According to the present invention such a jacket has plastic coating on both sides of a metallic layer and the plastic coating is heated to a flowable condition on at least one side of the jacket material and plastic is then extruded over the edges of the metallic layer so that the metal is completely sealed within the plastic coating. Unless the context indicates otherwise, the terms "jacket" and "sheath" will be used interchangeably herein.

In the preferred construction, the top edges of the bent-up tabs are trimmed with a knife to make them even. This leaves bare edges of metal, and it is these bare edges over which coating material is extruded from the sides of the tabs. The plastic is preferably heated to a temperature high enough so that when it is extruded across the tab edge from one side it bonds to the coating on the other side of the metallic layer to form a continuous coating. Preferably the softening temperature of the plastic coating on one surface of the metallic layer is lower than that on the other surface.

The apparatus for making the improved cable of this invention has means for heating the plastic coating next to the metal and/or between the tabs to a flowable temperature without fusing the outside surface of the plastic on the outside of the sheet. In the preferred embodiment, this heating is done by use of induction or high frequency heating that generates heat in the metallic layer quickly so that plastic in contact with the heated metal is heated to a flowable or fused condition before the outer circumference of the coated sheet is fused or excessively softened.

The invention includes an improved product and the apparatus and method of making it.

Other objects, features and advantages of the invention will appear or will be pointed out as the description proceeds.

In the drawings forming a part hereof, in which like reference characters indicate corresponding parts in all the views:

FIGURE 1 is a diagrammatic top plan view of apparatus for sealing a cable jacket in accordance with this invention;

FIGURE 2 is a greatly enlarged, sectional view taken on the line 2—2 of FIGURE 1 and showing the way in which the bent-up edges are trimmed off even with a knife;

FIGURES 3 and 4 are greatly enlarged, sectional views taken on the lines 3—3 and 4—4, respectively, of FIGURE 1;

FIGURE 5 is a sectional view, on a greatly enlarged scale, through the laminated jacket material, the section being taken on the line 5—5 of FIGURE 2; and FIGURE 6 is an enlarged sectional view taken on the line 6—6 of FIGURE 1.

An electric cable core 10 is advanced longitudinally in the direction indicated by the arrow 12; and a laminated strip 14 is bent around the core by a forming die 16 which bends the edge portions of the strip 14 upwardly and brings them together to form a longitudinal seam 18 with upstanding tabs 20, as shown in FIGURE 2. This is a conventional operation well understood in the art.

The strip 14 has a metallic layer, such as aluminum foil 22, which is the vapor impervious component of the strip, best shown in FIGURE 5. The foil 22 is coated on both sides by a plastic coating, preferably a polyolefin coating and in the preferred construction this coating includes a coating 24 on the inside surface of the foil and a coating 26 on the outside surface of the foil. The inner coating 24 preferably is a copolymer of polyethylene modified by monomers containing reactive carboxyl groups which give the desired bonding characteristics. The coating 24 is chemically bonded to the foil or metal layer 22.

The outer coating 26 is preferably a composite coating made in two layers. These layers include a layer 28 chemically bonded to the metallic layer 22 and preferably made of the same low density copolymer as the coating 24. An outer layer 30 preferably is made of high density polyethylene which has a higher melting point than the low density copolymers of the coating 24 and the layer 28. This layer 30 is bonded to the underlying layer 28.

In the construction illustrated, the metallic layer 22 has a thickness of 0.0007". The inner coating 24 has a thickness of 0.005". The outer coating 26 has a thickness of 0.007", of which 0.002" is the thickness of the layer 28 and 0.005" is the thickness of the layer 30. These figures are given merely by way of illustration. Different thicknesses can be used and the materials can be equivalents of those described, or other materials which are suitable on electric cable sheaths.

The strip 14 provides a liquid and vapor impervious sheath around the core 10, and with this invention the plastic coating of the jacket not only makes the seam substantially vapor-impervious, but also protects the edges of the metallic layer with the continuous plastic coating across the seam.

In conventional methods for jacketing electric cables the tabs bent upwardly along the seam are quite often not of the same height. The forming die does not form the strip so perfectly as to maintain even edges at the tops of the tabs and this invention provides a knife 31, or other trimming means, for trimming the upper ends of the tabs 20 so as to bring the edges of both of the tabs even with one another.

The knife 31 is thermostatically heated and controlled to provide a continuous tack by superficial melting and fusing of the copolymer as the freshly cut edge passes along the hot knife surface. FIGURE 2 illustrates this phenomenon by the discontinuance of the line delineating opposing copolymer films where it approaches the knife face. This continuous superficial seal or tack holds the edges in "as-cut alignment" during the following heating and rolling phases to allow for uniform formation of the extrudate. This leaves a raw exposed edge of the metallic layer 22 at the top of each of the tabs 20. The waste trimmed off by the knife 31 is indicated in FIGURES 1 and 2 by the reference character 32.

Beyond the trimming station at which the knife 31 is located, the formed tube or jacket 14' passes a high frequency induction coil 33, which is preferably water cooled and formed to extend along both sides of the upturned seam, as shown in FIGURE 3. This high frequency induction coil 33 causes heat to be generated in the metallic layer 22 and this heat raises the temperature of the inner coating 24 and the layer 28 of the outer coating which is in contact with the metal layer 22.

The heating is continued until the coating 24 and coating layer 28 reach a flowable temperature. This may be a fusion temperature, or a softening temperature somewhat below actual fusion. The heating is accomplished quickly so that there is not sufficient time for the heat to travel through the layer 28 and to soften or melt the outside surface of the layer 30. The layer 30 having a higher softening and melting temperature than the layer 28 makes it practical to heat the layer 28 to a flowable and bonding temperature without having the control of the process critical.

Emerging from the induction coil 33, the tabs 20 pass between rolls 34. These rolls are supported by axles 35 which are adjustable by lead screws 36 to bring the rolls 34 toward and from one another to control the pressure which they exert against the tabs 20. The rolls 34 are adjusted so that they squeeze the tabs 20 together with sufficient force to extrude flowable material of the inner coating 24 from between the tabs into a bead 40, as shown in FIGURE 4.

Plastic flow is restricted to the top of the tab due to the thermal gradient that exists in the tab as it moves through the squeeze rolls. The thermal gradient develops as the thermal conductivity of the laminate drains heat from the bottom of the tab and dissipates it through a large surface area of the strip and the cable core. Therefore, plastic flow takes place in the direction of least resistance, i.e. towards the hotter material at the top of the tab. As the plastic flows out from within the tab it flows together to form the bead 40 by surface tension effect.

The pressure of the rolls 34 against the outside coating 26 of the tabs 20 also extrudes some of the low density copolymer of the layer 28 from between the metallic layer 22 and the outer layer 30. This adds additional material to the bead 40 which merges with the material of the bead which has been extruded from the inner coating 24 to form a continuous, one-piece mass of merged copolymer that coats the exposed edges of the metal layer 22. Thus the continuous one-piece coating extends from the inner coating 24 across the upper edges of the metal layer 22 and down the other side of the metal layer.

The temperature of the bead 40, when originally extruded, is high enough to bond the material to the edges of the metallic layer 22. There is no problem of trapping air under the bead because the operation is progressive and the bead is formed along the edges of the tabs as the jacketed cable moves continuously in a longitudinal direction.

The tabs 20 are bonded together at their confronting faces by the fusing of the low density copolymer of the coating 24 on these confronting faces.

Beyond the rolls at the sealing station, the seam passes a stabilizing die 44 and then through a folding die 46 which bends the tabs over so that one of the tabs is bent back against the circumference of the tubular jacket 14' and the other tab overlies the bent back tab and is parallel to it as shown in FIGURE 6. This is a conventional operation in making jacketed cables. Beyond the folding die, the jacketed cable passes through an outer jacket or sheath extruder 50 which is also of conventional construction.

From the foregoing description it will be apparent that this invention provides a jacketed cable in which the coating on the jacket extends continuously around the entire circumference of the jacket, including the longitudinal seam which is formed as the jacket sheath is folded around a cable core. The sealed tab is of sufficient width to provide the same protection as elsewhere around the sheath and to provide a substantially vapor-impervious seam.

The preferred embodiment of the invention has been illustrated and described, but changes and modifications can be made, and some features can be used in different combinations without departing from the invention as defined in the claims.

What is claimed is:

1. Apparatus for making sheathed electric cable having a core surrounded by a longitudinally folded laminated strip which is formed into a longitudinal seam tube enclosing the core, the strip having a metallic layer and plastic coating on both sides of the metallic layer, said apparatus including, in combination, forming means for bending the strip into a tube around the core with upstanding tabs along the edge portions of the seam, a knife adjacent to the forming means in position to trim off the top edges of the tabs even with one another, heating means beyond the knife and along the path of longitudinal travel of the tabs, pressure means beyond the heating means and through which the tabs pass, the pressure means including elements closely spaced for moving the tabs closer together and squeezing out some of the coating from between the tabs to form a bead that covers the cut edges of the tabs, and other forming means that fold the tabs down against the circumference of the formed tube.

2. The apparatus described in claim 1 characterized by the heating means being high-frequency coils for generating heat in the metallic layer to melt the coating in contact with the metallic layer without melting the outer circumferential surface of the coating, the pressure means including rolls between which the tabs of the tube pass with the cut edges of the tabs at the top thereof, and means for adjusting the rolls to control the amount of coating that is extruded upward to spread over the top edges of the tabs.

3. Apparatus for sealing the longitudinal edges of a laminated electric cable sheath that has a metallic layer coated on both sides with plastic and formed into a longitudinal seam tube with the edge portions of the seam bent upwardly to form confronting tabs that have the inside coating on their circumferential surfaces bonded together, including in combination means for heating the coating on at least one side of the metallic layer to a flowable temperature, means for advancing the cable sheath and the tabs longitudinally to a pressure station, means for applying transverse pressure to the coated tabs at the pressure station with sufficient force to extrude a portion of the flowable coating and to cause it to spread over the edges of the tabs.

4. The apparatus described in claim 3 characterized by the means for heating being constructed and arranged to heat the coating between the tabs to a flowable temperature, and the means for advancing the cable sheath being in position to pass the tabs through the pressure station with the edges of the tabs at the top so that the flowable coating extrudes due to the pressure and thermal gradient to form the protective bead at the top edges of the tabs.

5. The apparatus described in claim 3 characterized by the means for heating the coated tabs being induction heating means to generate heat in the metallic layer, the induction heating means having a power output correlated with the mass of the plastic coating to effect the heating quickly to a degree that softens the coating in contact with the metallic layer to a flowable temperature, before the outside of the coating on the tabs flows.

6. The apparatus described in claim 3 characterized by a thermostatically controlled heated knife in position to cut off the coated tabs to an even height progressively along the length of the seam with bare edges of metal exposed at the upper ends of the tabs, and the means for applying said transverse pressure at said pressure station being spaced to exert a force that extrudes flowable coating material over the full width of the bare edges.

7. The apparatus described in claim 5 characterized by said heating means having a power output that fuses plastic coating that is on both the inside and the outside of the metallic layer, but limited to that part of the coating which is close to the metallic layer, and the spacing of pressure station from the heating means being correlated with the rate of movement of the sheath to have the plastic coating fused by the heating means still fused when it reaches the pressure station whereby coating flows over the bare edges from one side of the metallic layer and fuses to the coating on the other side to make the material that extends across the edges of the tab of one piece with the coatings on the inside and outside of the metallic layer.

References Cited

UNITED STATES PATENTS

| | | | |
|---|---|---|---|
| 3,183,300 | 5/1965 | Jachimowicz et al. | 156—54 X |
| 3,206,541 | 9/1965 | Jachimowicz | 156—54 X |
| 3,321,572 | 5/1967 | Garner | 156—54 X |
| 3,379,821 | 4/1968 | Garner | 156—54 X |

VERLIN R. PENDEGRASS, Primary Examiner

U.S. Cl. X.R.

156—267